(12) United States Patent
Liao et al.

(10) Patent No.: US 7,681,170 B2
(45) Date of Patent: Mar. 16, 2010

(54) METHOD AND APPARATUS FOR INSERTION OF FILLING FORMS WITHIN A DESIGN LAYOUT

(75) Inventors: Hongmei Liao, San Diego, CA (US); Illam Pakkirisamy, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 224 days.

(21) Appl. No.: 11/352,488

(22) Filed: Feb. 9, 2006

(65) Prior Publication Data

US 2007/0186202 A1     Aug. 9, 2007

(51) Int. Cl.
    *G06F 17/50*         (2006.01)
(52) U.S. Cl. .................................................. 716/19
(58) Field of Classification Search ............... 716/19–21
    See application file for complete search history.

(56) References Cited

U.S. PATENT DOCUMENTS

| | | | |
|---|---|---|---|
| 5,553,274 A | | 9/1996 | Liebmann |
| 5,740,068 A | * | 4/1998 | Liebmann et al. ............. 716/21 |
| 5,877,964 A | | 3/1999 | Liebmann et al. |
| 6,892,368 B2 | | 5/2005 | Li et al. |
| 2003/0014731 A1 | | 1/2003 | Lacour |
| 2005/0223350 A1 | * | 10/2005 | Zhang et al. .................. 716/21 |
| 2005/0229148 A1 | * | 10/2005 | Melvin, III .................. 716/21 |
| 2006/0085773 A1 | * | 4/2006 | Zhang ............................ 716/4 |
| 2006/0200790 A1 | * | 9/2006 | Shang et al. .................. 716/19 |
| 2007/0101310 A1 | * | 5/2007 | Stirniman et al. ............. 716/21 |

FOREIGN PATENT DOCUMENTS

WO         0023920        4/2000

OTHER PUBLICATIONS

International Search Report—PCT/US07/061941, International Search Authority—European Patent Office—Jul. 17, 2007.

* cited by examiner

*Primary Examiner*—Stacy A Whitmore
(74) *Attorney, Agent, or Firm*—Jiayu Xu

(57) ABSTRACT

A method and apparatus for insertion of filling forms within a design layout are described. One or more jog areas are identified within a circuit design layout. Subsequently, multiple filling forms are inserted within the circuit design layout, each filling form being configured to eliminate a corresponding jog area within the circuit design layout. One or more filling forms that violate at least one predetermined design rule applicable to the circuit design layout are identified. The filling forms are then adapted to comply with the predetermined design rule or rules. Finally, remaining filling forms in compliance with the predetermined design rule or rules are combined within the circuit design layout to form a circuit design output layout.

40 Claims, 5 Drawing Sheets

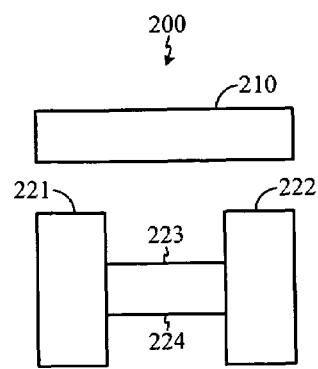
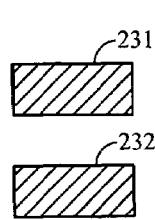
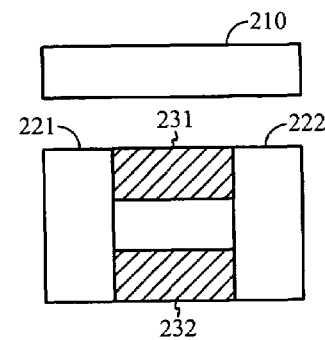
FIG. 2A        FIG. 2B        FIG. 2C
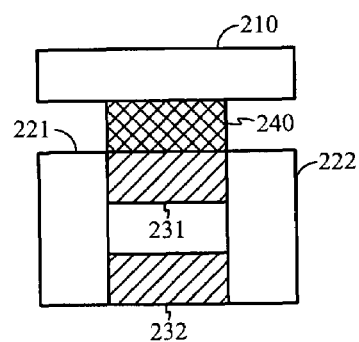
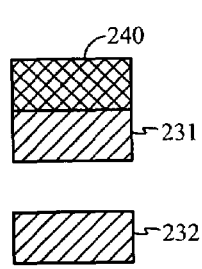
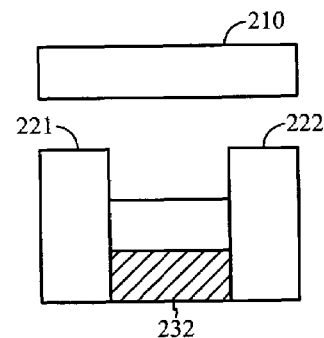
FIG. 2D        FIG. 2E        FIG. 2F

METHOD AND APPARATUS FOR INSERTION OF FILLING FORMS WITHIN A DESIGN LAYOUT

BACKGROUND

1. Field

The embodiments disclosed herein relate generally to manufacturing technologies for electronic circuits and, more specifically, to a method and apparatus for insertion of filling forms within a design layout to enable elimination of jog areas within the structure.

2. Background

In order to achieve increased semiconductor manufacturing yield, physical design data is generally inserted into a semiconductor design layout, before applying an optical proximity correction ("OPC") procedure to the integrated circuit database. The design layout is a representation of the integrated circuit and includes geometric shapes and layers that correspond to the physical structure used in actual fabrication. During the OPC procedure, the presence of small jog areas, notches, or other design errors in the design layout leads to a significant increase in data volume, reduced OPC results around the regions containing the errors, and increased difficulty in inspecting the masks of the design layout.

Typically, in an inspection process subsequent to insertion of filling forms, the design layout is subjected to a design rule checking procedure ("DRC"), which applies a collection of design rules to the layout to detect any potential design rule violations and to minimize defects in the fabrication process. In one example, one potential design rule violation relates to the encroachment of a geometric shape into the spacing mandated between the geometric shapes and layers of the design layout. Thus, any removal of jog areas and notches from the design layout should be performed with a view to achieving a DRC-clean design layout.

Several approaches have been proposed to remove the jog areas and notches from the design layout. In one such approach, the jog areas and notches are removed manually via a modification of the geometries of the design layout. However, this approach is labor-intensive and time-consuming.

Another approach involves the use of a script to insert appropriate patches to remove corresponding jog areas in the design layout. However, this approach could create a high number of circuit design rule violations, which subsequently have to be manually modified to comply with the appropriate design rules.

Thus, what is needed is a method and apparatus to insert filling forms within a design layout such that jog areas and notches present in the design layout are removed automatically in compliance with appropriate circuit design rules.

SUMMARY

A method and apparatus for insertion of filling forms within a design layout are described. One or more jog areas are identified within a circuit design layout. Subsequently, multiple filling forms are inserted within the circuit design layout, each filling form being configured to eliminate a corresponding jog area within the circuit design layout. One or more filling forms that violate at least one predetermined design rule applicable to the circuit design layout are identified. The filling forms are then adapted to comply with the predetermined design rule or rules. Finally, remaining filling forms in compliance with the predetermined design rule or rules are combined within the circuit design layout to form a circuit design output layout.

BRIEF DESCRIPTION OF THE DRAWINGS

FIGS. 2A through 2F are block diagrams illustrating an alternate embodiment for the method for insertion of filling forms within a design layout;

DETAILED DESCRIPTION

FIGS. 1A through 1F are block diagrams illustrating one embodiment for a method for insertion of filling forms within a design layout. In one embodiment, the method is implemented in a flow of instructions executed in an apparatus or medium, such as, for example, a computer system using scripts.

Figure 1A:
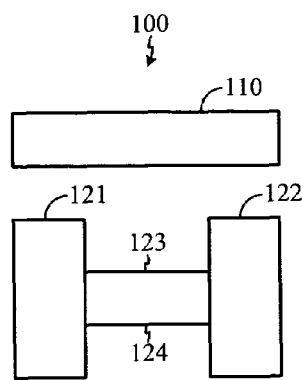
FIGS. 1A through 1F are block diagrams illustrating one embodiment for a method for insertion of filling forms within a design layout.
Figure 1B:
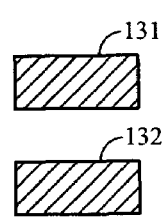

FIG. 1A illustrates a design layout 100, which includes multiple geometric shapes and layers 110, 121, 122. Layers 121 and 122 define concave jog areas 123, 124. Since the presence of jog areas in the design layout 100 may lead to increased difficulty in performing the optical proximity correction ("OPC") procedure, each jog area 123, 124 must be removed by placing a corresponding predetermined filling form over the respective jog area 123, 124. FIG. 1B illustrates filling forms 131, 132 configured to correct and eliminate the jog areas 123, 124 and to be inserted during the flow into the design layout 100.

Figure 1C:
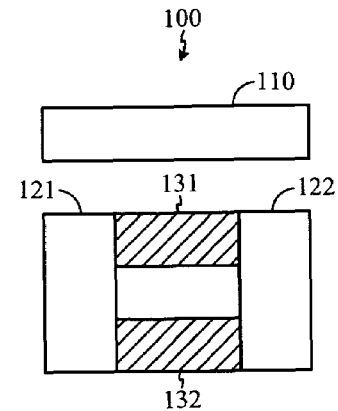

In one embodiment, as shown in FIG. 1C, subsequent to the identification of the jog areas 123, 124, the flow inserts the filling forms 131, 132 into the design layout. Specifically, the filling form 131 is inserted to eliminate the jog area 123 and the filling form 132 is inserted to eliminate the jog area 124. Filling form data is then merged with the input design layout data for further processing, as described in detail below.

Figure 1D:
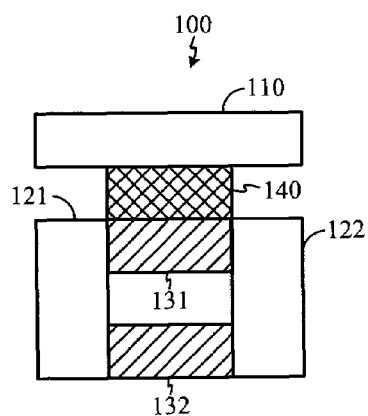

As illustrated in FIG. 1D, in one embodiment, the flow performs a design rule checking ("DRC") procedure on the merged data to identify design rule violations. If, for example, the design rule provides for a predetermined spacing between any inserted filling form and an existing metal layer or geometry, the DRC procedure analyzes the inserted filling forms 131 and 132 and the spacing between the filling forms 131, 132 and respective adjacent geometric shapes or layers 110, 121, and 122 to identify if any filling form 131, 132 violates the predetermined design rule. In an alternate embodiment, the DRC procedure checks for violations of a set of design rules implemented for the design layout 100.

Figure 1E:
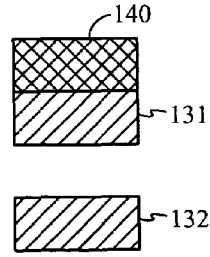
Figure 1F:
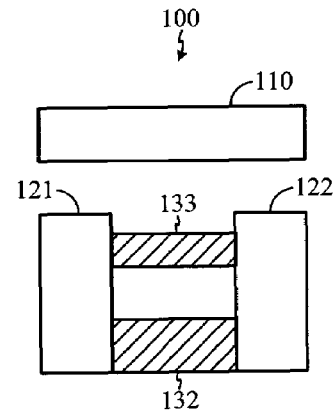

In one embodiment, the design rule violations are organized by layer, such as, for example, all polysilicon-related violations are generated on one single layer. Assuming that the flow identifies a design rule violation, wherein the spacing 140 between the filling form 131 and the existing metal layer 110 is less than the predetermined design spacing, then, as shown in FIG. 1E, the filling forms 131 and 132 and the identified spacing 140 are removed and a decision is made whether the filling form 131 can be customized to comply with the design rule. If the filling form 131 is customizable, then the flow modifies the filling form 131 to obtain a modified filling form 133. The spacing between the modified filling form 133 and the layer 110 satisfies the predetermined spacing predicated in the above-mentioned design rule. Finally, as shown in FIG. 1F, the flow inserts the filling form 132, which is free of any violations, back into the design layout 100 and further inserts the modified filling form 133 into the design layout 100 to obtain a DRC-clean design layout.

FIGS. 2A through 2F are block diagrams illustrating an alternate embodiment for the method for insertion of filling forms within a design layout. FIG. 2A illustrates a design layout 200, which includes multiple geometric shapes and layers 210, 221, 222. Layers 221 and 222 define concave jog areas 223, 224. Since the presence of jog areas in the design layout 200 may lead to increased difficulty in performing the OPC procedure, each jog area 223, 224 must be removed by placing a corresponding predetermined filling form over the respective jog area 223, 224. FIG. 2B illustrates filling forms 231, 232 configured to correct and eliminate the jog areas 223, 224 and to be inserted during the flow into the design layout 200.

In one embodiment, as shown in FIG. 2C, subsequent to the identification of the jog areas 223, 224, the flow inserts the filling forms 231, 232 into the design layout. Specifically, the filling form 231 is inserted to eliminate the jog area 223 and the filling form 232 is inserted to eliminate the jog area 224. Filling form data is then merged with the input design layout data for further processing, as described in detail below.

As illustrated in FIG. 2D, in one embodiment, the flow performs a DRC procedure on the merged data to identify design rule violations. If, for example, the design rule provides for a predetermined spacing between any inserted filling form and an existing metal layer or geometry, the DRC procedure analyzes the inserted filling forms 231 and 232 and the spacing between the filling forms 231, 232 and respective adjacent geometric shapes or layers 210, 221, and 222 to identify if any filling form 231, 232 violates the predetermined design rule. In an alternate embodiment, the DRC procedure checks for violations of a set of design rules implemented for the design layout 200.

Assuming that the flow identifies a design rule violation, wherein the spacing 240 between the filling form 231 and the existing metal layer 210 is less than the predetermined design spacing, then, as shown in FIG. 2E, the filling forms 231 and 232 and the identified spacing 240 are removed and a decision is made whether the filling form 231 can be customized to comply with the design rule. If the filling form 231 is not customizable, then the flow removes and discards the filling form 231. Finally, as shown in FIG. 2F, the flow inserts the filling form 232, which is free of any violations, back into the design layout 200 to obtain a DRC-clean design layout.

Figure 3:
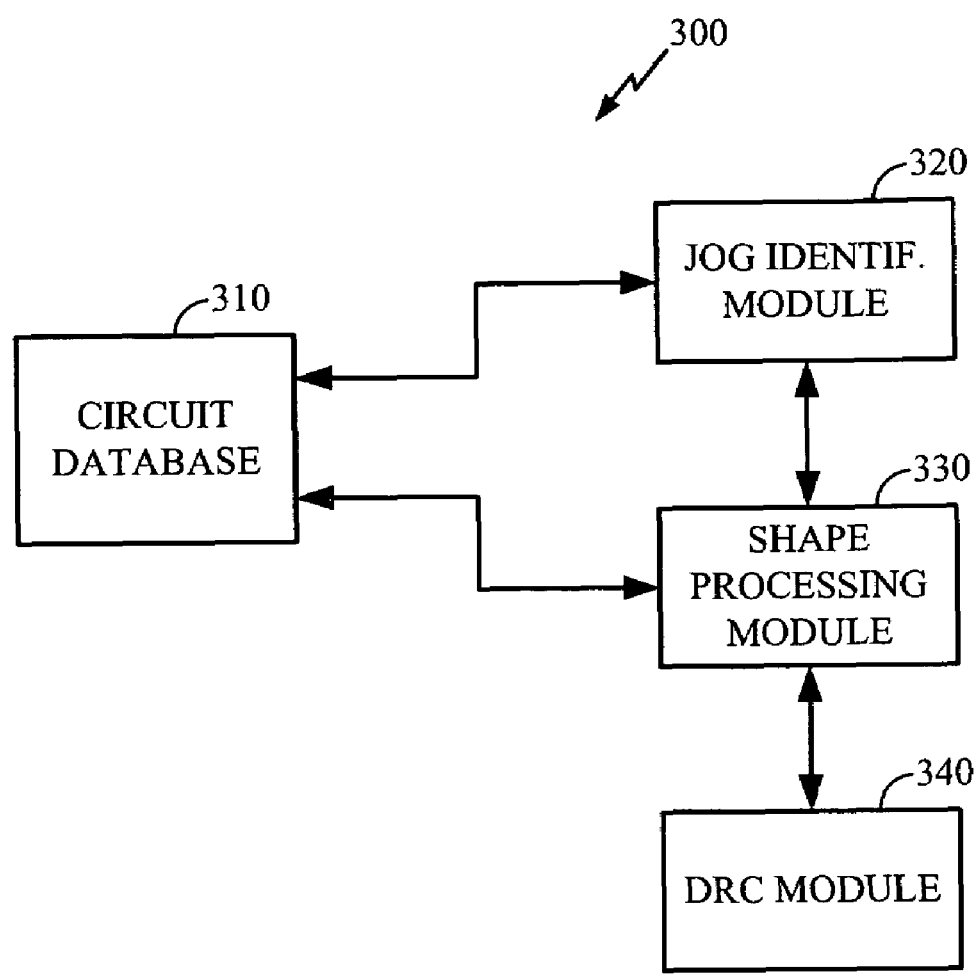
FIG. 3 is a block diagram illustrating one embodiment for an apparatus for insertion of filling forms within a design layout.

FIG. 3 is a block diagram illustrating one embodiment for an apparatus for insertion of filling forms within a design layout. As illustrated in FIG. 3, in one embodiment, the apparatus 300 further includes a circuit database 310 to store circuit design layout data, filling form data, merged data between the design layout data and filling form data, and other data.

In one embodiment, the apparatus 300 further includes a jog identification module 320 coupled to the circuit database 310 to receive input data containing the design layout data and to identify jog areas within the design layout.

The apparatus 300 further includes a shape processing module 330 coupled to the jog identification module 320 and the circuit database 310 to receive the design layout data and the identified jog areas, to create and insert filling forms within the design layout in order to eliminate the jog areas, and to merge the filling form data with the input data containing the design layout data.

The apparatus further includes a design rule checking ("DRC") module 340 coupled to the shape processing module 330 to receive the merged data and to perform a design rule checking procedure to identify filling forms that violate at least one predetermined design rule associated with the corresponding design layout. If, for example, the design rule provides for a predetermined spacing between any inserted filling form and an existing metal layer or geometry, the DRC module 340 analyzes the spacing between the inserted filling form and the layer within the circuit design layout, and determines if the spacing is less than the predetermined spacing provided in the predetermined design rule.

The DRC module 340 further transmits the results of the design rule checking procedure, i.e. any design rule violations, to the shape processing module 330, which adapts the filling form associated with a design rule violation, either by modifying it to comply with the design rule, if the respective filling form is customizable, or, in the alternative, by removing the filling form altogether from the design layout. Finally, the shape processing module 330 combines the remaining filling forms, either customized or violation-free, within the design layout to form a DRC-clean design output layout.

Figure 4:
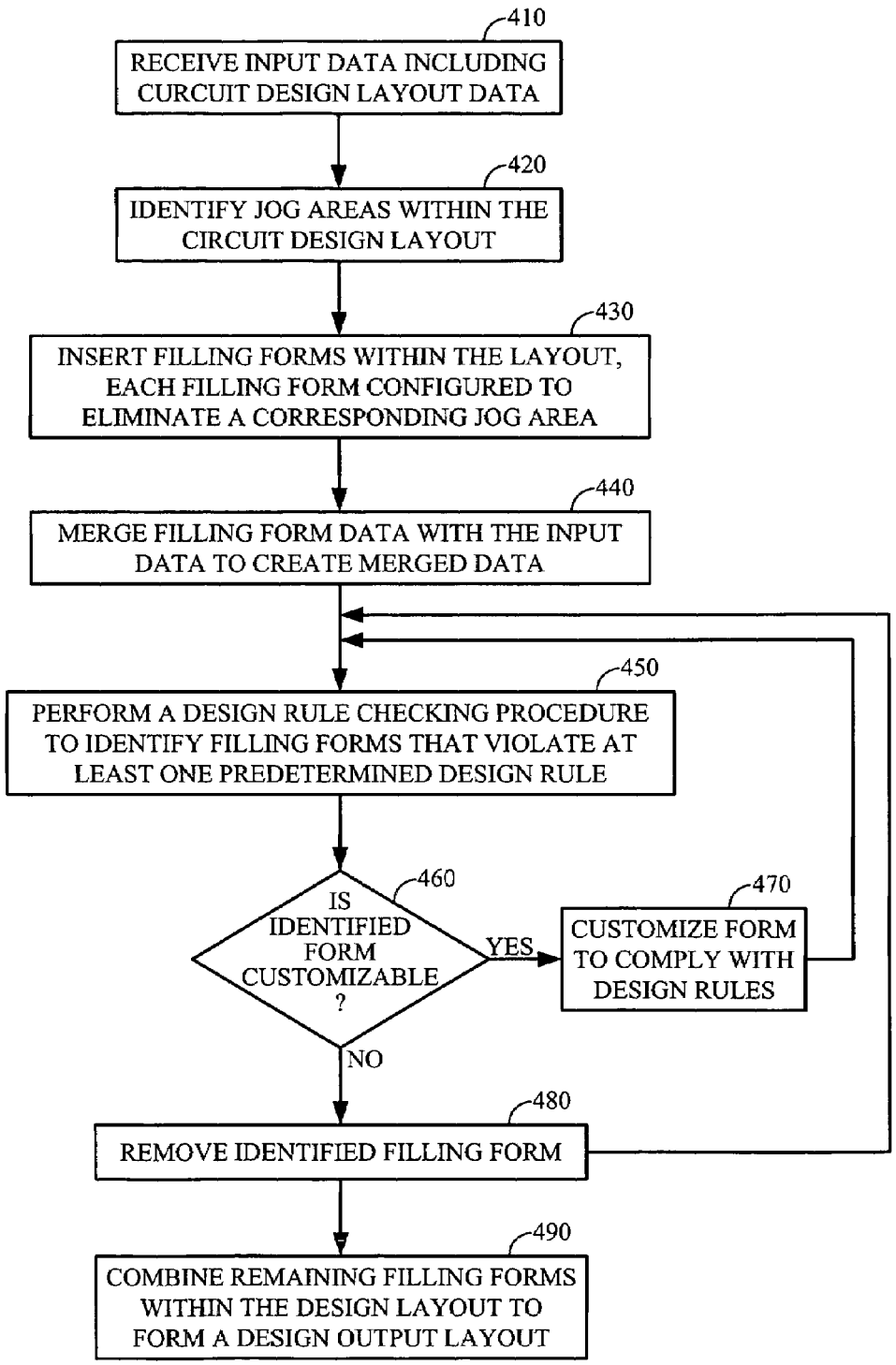
FIG. 4 is a flow diagram illustrating one embodiment for a method for insertion of filling forms within a design layout.

FIG. 4 is a flow diagram illustrating one embodiment for a method for insertion of filling forms within a design layout. As illustrated in FIG. 4, in one embodiment, at processing block 410, input data is received, the input data containing the circuit design layout data.

At processing block 420, jog areas are identified within the circuit design layout. At processing block 430, filling forms are inserted within the design layout, each filling form being configured to eliminate a corresponding jog area.

At processing block 440, the filling form data is merged with the input data containing the design layout data to create merged data. At processing block 450, an iterative design rule checking procedure is performed to identify any filling forms that violate at least one predetermined design rule.

At processing block 460, a decision is made whether an identified filling form that violates at least one predetermined design rule is customizable. If the filling form is customizable, at processing block 470, the filling form is customized to comply with the one or more predetermined design rules. Then, processing blocks 450 and 460 are repeated for subsequent identified filling forms.

Otherwise, if the filling form is not customizable, at processing block 480, the filling form is removed and processing blocks 450 through 480 are repeated for subsequent identified filling forms. Finally, at processing block 490, the remaining filling forms are combined within the design layout to form a design output layout, which is free of any design rule violations.

Figure 5:
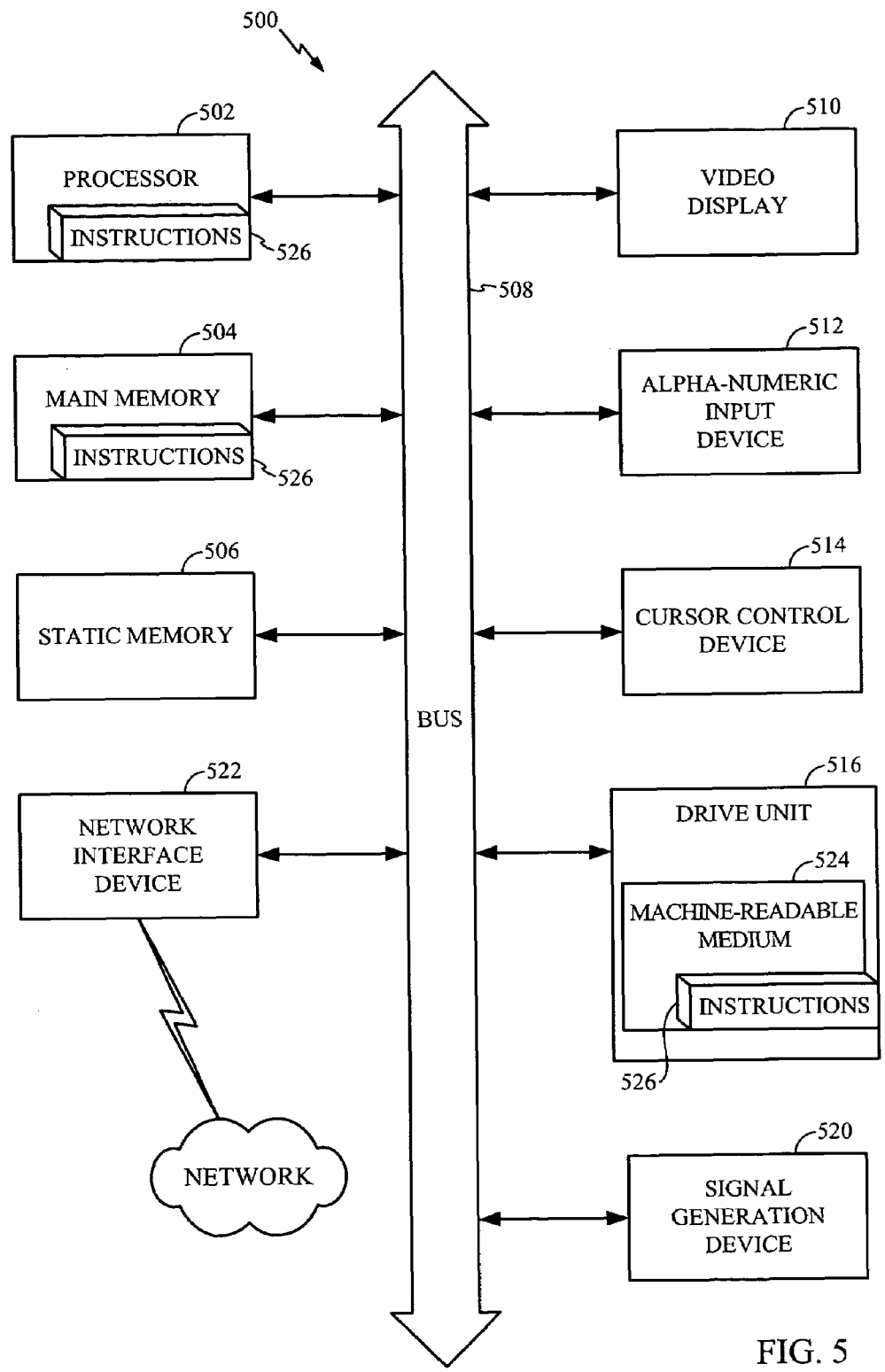
FIG. 5 is a diagrammatic representation of a machine in the exemplary form of a computer system within which a set of instructions may be executed.

FIG. 5 shows a diagrammatic representation of a machine in the exemplary form of a computer system 500 within which a set of instructions, for causing the machine to perform any one of the methodologies discussed above, may be executed. In alternative embodiments, the machine may comprise a network router, a network switch, a Personal Digital Assistant (PDA), a cellular telephone, a web appliance or any machine or computing device capable of executing a sequence of instructions that specify actions to be taken by that machine.

The computer system 500 includes a processor 502, a main memory 504 and a static memory 506, which communicate with each other via a bus 508. The computer system 500 may further include a video display unit 510, e.g. a liquid crystal display (LCD) or a cathode ray tube (CRT). The computer system 500 also includes an alphanumeric input device 512, e.g., a keyboard, a cursor control device 514, e.g. a mouse, a disk drive unit 516, a signal generation device 520, e.g. a speaker, and a network interface device 522.

The disk drive unit 516 includes a machine-readable medium 524 on which is stored a set of instructions, i.e. software, 526 embodying any one, or all, of the methodologies described above. The software 526 is also shown to reside, completely or at least partially, within the main memory 504 and/or within the processor 502. The software 526 may further be transmitted or received via the network interface device 522.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in software executed by a processor, or in a combination of the two. It is to be understood that these embodiments may be used as or to support software programs, which are executed upon some form of processor or processing core (such as the CPU of a computer), or otherwise implemented or realized upon or within a machine or computer readable medium. A machine readable medium includes any mechanism for storing or transmitting information in a form readable by a machine (e.g., a computer). For example, a machine readable medium includes RAM memory, flash memory, ROM memory, EPROM memory, EEPROM memory, registers, hard disk, a removable disk, a CD-ROM, or any other form of storage medium known in the art. An exemplary storage medium is coupled to the processor such the processor may read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use such embodiments. Various modifications to these embodiments will be readily apparent to those skilled in the art, and the generic principles defined herein may be applied to other embodiments without departing from the spirit or scope of the disclosed embodiments. Thus, the embodiments are not intended to be limited to the disclosure shown herein but are to be accorded the widest scope consistent with the principles and novel features disclosed herein.

What is claimed is:

1. A method performed in a computer system to output a circuit design layout, comprising:
    automatically inserting a plurality of predetermined filling forms within a circuit design layout stored in memory of the computer system, each filling form of said plurality of predetermined filling forms being configured to eliminate a corresponding jog area of a plurality of jog areas within said circuit design layout;
    automatically identifying a filling form of said plurality of predetermined filling forms that violates at least one predetermined design rule applicable to said circuit design layout;
    automatically determining whether the identified filling form that violates at least one predetermined design rule can be customized;
    automatically adapting said filling form that violates at least one predetermined design rule to comply with said at least one predetermined design rule if it is determined that the filling form can be customized; and
    automatically combining remaining predetermined filling forms in compliance with said at least one predetermined design rule within said circuit design layout to form a circuit design output layout that is output by the computer system.

2. The method according to claim 1, further comprising identifying each jog area of said plurality of jog areas within said circuit design layout.

3. The method according to claim 1, further comprising:
    receiving input data containing said circuit design layout data; and
    automatically merging said input data with data corresponding to said plurality of predetermined filling forms to create merged data.

4. The method according to claim 3, further comprising automatically identifying said filling form that violates said at least one predetermined design rule from said merged data.

5. The method according to claim 1, wherein said adapting further comprises automatically modifying said filling form that violates at least one predetermined design rule to comply with said at least one predetermined design rule.

6. The method according to claim 1, wherein said adapting further comprises automatically removing and discarding said filling form that violates at least one predetermined design rule from said circuit design layout.

7. The method according to claim 1, wherein said at least one predetermined design rule further comprises a predetermined spacing between said filling form that violates at least one predetermined design rule and a plurality of adjacent layers within said circuit design layout.

8. The method according to claim 7, wherein said identifying further comprises:
   automatically analyzing a spacing between said filling form that violates at least one predetermined design rule and each layer of said plurality of adjacent layers within said circuit design layout; and
   automatically determining if said spacing is less than said predetermined spacing of said at least one predetermined design rule.

9. The method according to claim 7, wherein each layer of said plurality of adjacent layers is a metal layer.

10. The method according to claim 1, wherein said identifying further comprises automatically performing a design rule checking procedure on said circuit design layout.

11. An apparatus comprising:
   a shape processing module configured to insert a plurality of predetermined filling forms within a circuit design layout, each filling form of said plurality of predetermined filling forms being configured to eliminate a corresponding jog area of a plurality of jog areas within said circuit design layout; and
   a design rule checking module coupled to said shape processing module and configured to identify a filling form of said plurality of predetermined filling forms that violates at least one predetermined design rule applicable to said circuit design layout,
   wherein said shape processing module is further configured to:
   determine whether the identified filling form that violates at least one predetermined design rule can be customized;
   adapt said the filling form that violates at least one predetermined design rule to comply with said at least one predetermined design rule if it is determined that the filling form can be customized, and
   combine remaining predetermined filling forms in compliance with said at least one predetermined design rule within said circuit design layout to form a circuit design output layout.

12. The apparatus according to claim 11, further comprising a jog identification module coupled to said shape processing module and configured to identify each jog area of said plurality of jog areas within said circuit design layout.

13. The apparatus according to claim 11, wherein said shape processing module is further configured to receive input data containing said circuit design layout data from a circuit database coupled to said shape processing module and said design rule checking module, and to merge said input data with data corresponding to said plurality of predetermined filling forms to create merged data.

14. The apparatus according to claim 13, wherein said design rule checking module is further configured to identify said filling form that violates said at least one predetermined design rule from said merged data.

15. The apparatus according to claim 11, wherein said shape processing module is further configured to modify said filling form that violates at least one predetermined design rule to comply with said at least one predetermined design rule.

16. The apparatus according to claim 11, wherein said shape processing module is further configured to remove and discard said filling form that violates at least one predetermined design rule from said circuit design layout.

17. The apparatus according to claim 11, wherein said at least one predetermined design rule further comprises a predetermined spacing between said filling form that violates at least one predetermined design rule and a plurality of adjacent layers within said circuit design layout.

18. The apparatus according to claim 17, wherein said design rule checking module is further configured to analyze a spacing between said filling form and each layer of said plurality of adjacent layers within said circuit design layout, and to determine if said spacing is less than said predetermined spacing of said at least one predetermined design rule.

19. The apparatus according to claim 17, wherein each layer of said plurality of adjacent layers is a metal layer.

20. The apparatus according to claim 11, wherein said design rule checking module is further configured to perform a design rule checking procedure on said circuit design layout.

21. An apparatus comprising:
   means for inserting a plurality of predetermined filling forms within a circuit design layout, each filling form of said plurality of predetermined filling forms being configured to eliminate a corresponding jog area of a plurality of jog areas within said circuit design layout;
   means for identifying a filling form of said plurality of predetermined filling forms that violates at least one predetermined design rule applicable to said circuit design layout;
   means for determining whether the identified filling form that violates at least one predetermined design rule can be customized;
   means for adapting said filling form that violates at least one predetermined design rule to comply with said at least one predetermined design rule if it is determined that the filling form can be customized; and
   means for combining remaining predetermined filling forms in compliance with said at least one predetermined design rule within said circuit design layout to form a circuit design output layout.

22. The apparatus according to claim 21, further comprising means for identifying each jog area of said plurality of jog areas within said circuit design layout.

23. The apparatus according to claim 21, further comprising:
   means for receiving input data containing said circuit design layout data; and
   means for merging said input data with data corresponding to said plurality of predetermined filling forms to create merged data.

24. The apparatus according to claim 23, further comprising means for identifying said filling form that violates said at least one predetermined design rule from said merged data.

25. The apparatus according to claim 21, further comprising means for modifying said filling form that violates at least one predetermined design rule to comply with said at least one predetermined design rule.

26. The apparatus according to claim 21, further comprising means for removing and discarding said filling form that violates at least one predetermined design rule from said circuit design layout.

27. The apparatus according to claim 21, wherein said at least one predetermined design rule further comprises a predetermined spacing between said filling form and a plurality of adjacent layers within said circuit design layout.

28. The apparatus according to claim 27, further comprising:
   means for analyzing a spacing between said filling form and each layer of said plurality of adjacent layers within said circuit design layout; and means for determining if said spacing is less than said predetermined spacing of said at least one predetermined design rule.

29. The apparatus according to claim 27, wherein each layer of said plurality of adjacent layers is a metal layer.

30. The apparatus according to claim 21, further comprising means for performing a design rule checking procedure on said circuit design layout.

31. A computer readable storage medium encoded with computer-executable instructions comprising:
   an instruction for inserting a plurality of predetermined filling forms within a circuit design layout, each filling form of said plurality of predetermined filling forms being configured to eliminate a corresponding jog area of a plurality of jog areas within said circuit design layout;
   an instruction for identifying a filling form of said plurality of predetermined filling forms that violates at least one predetermined design rule applicable to said circuit design layout;
   an instruction for determining whether the identified filling form that violates at least one predetermined design rule can be customized;
   an instruction for adapting said filling form that violates at least one predetermined design rule to comply with said at least one predetermined design rule if it is determined that the filling form can be customized; and
   an instruction for combining remaining predetermined filling forms in compliance with said at least one predetermined design rule within said circuit design layout to form a circuit design output layout.

32. The computer readable storage medium according to claim 31, wherein said computer-executable instructions further comprise an instruction for identifying each jog area of said plurality of jog areas within said circuit design layout.

33. The computer readable storage medium according to claim 31, wherein said computer-executable instructions further comprise:
   an instruction for receiving input data containing said circuit design layout data; and
   an instruction for merging said input data with data corresponding to said plurality of filling forms to create merged data.

34. The computer readable storage medium according to claim 33, wherein said computer-executable instructions further comprise an instruction for identifying said filling form that violates said at least one predetermined design rule from said merged data.

35. The computer readable storage medium according to claim 31, wherein said instruction for adapting further comprises an instruction for modifying said filling form to comply with said at least one predetermined design rule.

36. The computer readable storage medium according to claim 31, wherein said instruction for adapting further comprises an instruction for removing and discarding said filling form from said circuit design layout.

37. The computer readable storage medium according to claim 31, wherein said at least one predetermined design rule further comprises a predetermined spacing between said filling form and a plurality of adjacent layers within said circuit design layout.

38. The computer readable storage medium according to claim 37, wherein said instruction for identifying further comprises:
   an instruction for analyzing a spacing between said filling form and each layer of said plurality of adjacent layers within said circuit design layout; and
   an instruction for determining if said spacing is less than said predetermined spacing of said at least one predetermined design rule.

39. The computer readable storage medium according to claim 37, wherein each layer of said plurality of adjacent layers is a metal layer.

40. The computer readable storage medium according to claim 31, wherein said instruction for identifying further comprises an instruction for performing a design rule checking procedure on said circuit design layout.

* * * * *